Aug. 19, 1969 P. J. RIEPPEL ET AL 3,461,540
SYSTEM FOR WELDING PIPELINES
Filed May 23, 1966 2 Sheets-Sheet 1

P. J. RIEPPEL
J. W. NELSON INVENTORS

BY Donald F. Cullen
PATENT ATTORNEY

Aug. 19, 1969  P. J. RIEPPEL ET AL  3,461,540
SYSTEM FOR WELDING PIPELINES
Filed May 23, 1966  2 Sheets-Sheet 2
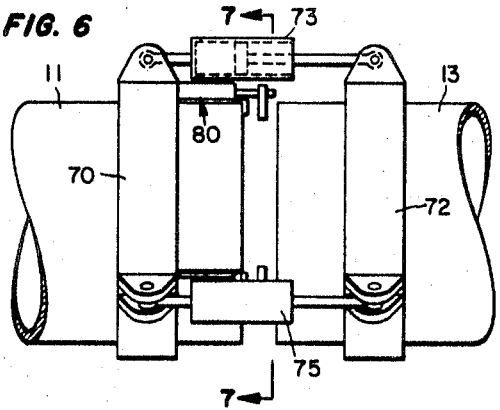
FIG. 6
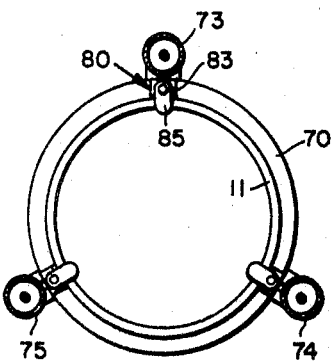
FIG. 7
FIG. 8
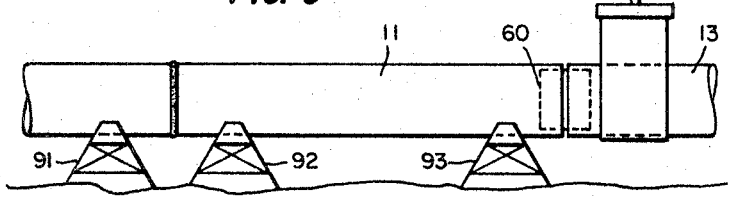
FIG. 9
FIG. 10
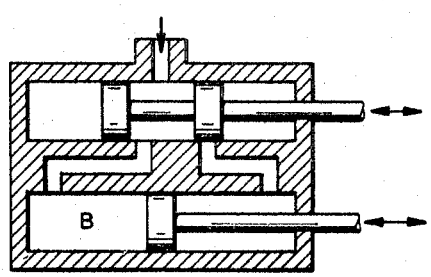
FIG. 11
P. J. RIEPPEL
J. W. NELSON
INVENTORS
BY Donald F. Wohlers
PATENT ATTORNEY United States Patent Office 3,461,540
Patented Aug. 19, 1969

3,461,540
SYSTEM FOR WELDING PIPELINES
Perry J. Rieppel, Worthington, and Jerome W. Nelson, Upper Arlington, Ohio, assignors to Esso Research and Engineering Company, Elizabeth, N.J., a corporation of Delaware
Filed May 23, 1966, Ser. No. 552,318
Int. Cl. B23k *35/02;* B23p *11/00*
U.S. Cl. 29—493         5 Claims The present invention relates to an improved system for pipeline construction. It relates particularly to the construction of pipelines involving welding of girth joints between the respective lengths of pipe. While applicable to lines of various sizes, the invention is particularly suitable for the construction of pipelines of large diameter.

One of the chief sources of delay in pipeline construction is the girth joint welding operation. On large lines, particularly, considerable construction equipment is required for pipeline excavation, pipe handling, wrapping, welding, back-filling, etc. Heavy capital expenses are involved. Any delay which can be avoided must be eliminated in the interest of efficient use of the expensive equipment as well as labor. It is important that the line construction not be held up while waiting for welding operations. The nature of welding, particularly electric arc welding of butt joint girth welds, is such that occasional delays are very frequently encountered, even with the best of equipment and procedures. Moreover, welds must be inspected in detail, and flaws which are found must be repaired or eliminated. It is essential, meanwhile, that the other operations such as excavation, stringing the pipe and its lining up and assembly proceed efficiently without too much regard to the welding operation.

According to the present invention the new length of pipe which is to be attached to that portion of the line which has been started, referred to hereafter as the installed line, is brought into proper relationship for formation of the joint and is held under automatic control in such relationship while the welding operation is undertaken. In the past considerable delay has been encountered in securing proper alignment as the new pipe joint is brought into position. Further delay is occasioned when a misalignment occurs after the pipe has been once lined up. Important objects of the present invention are to align the pipe joint quickly in the first place and maintain continuous alignment of the new pipe length so efficiently and effectively as to avoid delays commonly incident to welding. This procedure makes it possible for welding to start almost immediately when the pipe is brought into place. Quick alignment and precise maintenance of alignment give the welder more time to finish welding the joint while the next pipe length is brought into place for welding.

The concept of the present invention employs a plurality of feeler elements at the joint and uses these to control the pipe aligning equipment automatically. The feelers are so located and arranged that they sense the proper placement of the pipe. They are designed to communicate any maladjustment to an automatic corrective mechanism. The new length of pipe to be added onto the existing line is brought into approximate position and then automatic controls, described hereinafter and directed by the feelers, take charge of the pipe and hold it in place. These are adapted to maintain joint alignment even though the holding equipment may be shifting slightly.

For example, when pipe handling cranes are mounted on crawler type tractors, as is a common practice, these cranes, or devices connected to them, are controlled automatically from the feelers to hold the pipe not only at the proper level but also with the adjoining pipe end surfaces kept in proper parallelism. At the same time the tractors or cranes may be fitted with rigid "straight arm" devices which can operate automatically, under control of the same feelers, to hold the pipe in proper lateral position with respect to the installed line.

Under normal conditions, the axis of the new length of pipe should coincide with the axis of the installed line. More importantly, however, the end surfaces of the pipe must be in plane and must be kept parallel. Also, the periphery of the new pipe should align throughout its circumference with that of the installed pipe so that when the two are welded together to form a butt joint a smooth internal surface as well as a strong joint is produced.

A further object of the present invention, then, is to design mechanism which will automatically compensate for any shifting, sliding or settling of the cranes or lifting devices or props which support the pipe during alignment and welding. The arrangement of these controls and their associated mechanism is such that, if the tractor holding the pipe begins to settle in soft ground or to slide, the feeler gauges will transmit a signal to hoist mechanism to lift the pipe higher and compensate for the settling. If the movement is lateral, the "straight arm" will automatically move in or out as required and maintain proper lateral alignment at the joint. The controls can effect simultaneous operation of the various pipe handling elements from a single set of feelers.

The invention preferably makes use of an automatic joint preparing and welding unit such as that described generally in U.S. Patents Nos. 3,084,244 and 3,084,246. However, the welding equipment per se may be varied and other types may be used, if desired, so long as they operate rapidly and efficiently to take advantage of the automatic alignment and maintenance of alignment provided by the present invention.

Preferably the welding head is mounted on a suitable support for movement in an orbit around the girth joint. A track or frame is provided for guiding the welder in its orbital movement around the pipe. This track or frame preferably is mounted concentrically with the pipeline and closely adjacent to the joint to be welded. The welding unit preferably involves a gap preparing cutter which is designed to cut a narrow space between the adjacent pipe ends. This cutter may be either a thin abrasive wheel or a milling type cutter, as desired. The arrangement preferably is such that the cutter moves ahead of the welding head, but preferably just far enough ahead for clearance. The feelers are sufficient in number, preferably three, since three points determine a plane. They may be so operated that only one of them is removed at a time from the joint as the cutter-welder approaches, the others remaining in place to perform their functions until they are retired one by one and finally the joint is substantially completed. However, once alignment is established, an internal clamp is preferably expanded into holding position and the feelers can all be removed from the gap between the pipe ends. Other controls make this possible.

A welding system using a slender wire type consumable electrode is preferred for the welding operation. The cutter may cut out a full gap between pipe ends that are in close or tight abutment, or, alternatively or preferably, it may be used only to smooth the end surfaces of pipe elements that are spaced to almost the desired gap width. As pointed out in the patents mentioned above, the gap is quite a narrow one, usually of the order of .030 to .075 inch or so, and it is important that this gap be kept essentially uniform in width around the complete circumference until the weld is completed.

In the preferred system, the welding unit, which comprises a circular or partly circular frame surrounding or partly surrounding the pipe, is used as a pipe supporting means. With this arrangement, the welder and pipe are lifted and supported by a suitable crane, e.g. tractor mounted. Between the crane and the welding unit is connected a null or zero-seeking device which can be under control of the feelers previously mentioned. This device which will be further described hereinafter, operates by suitable means, preferably hydraulic or pneumatic, to raise or lower the pipe as the feelers indicate is needed to make the gap uniform in width about the joint periphery.

Inside the abutting pipe ends is a more or less conventional line-up clamp. As is well known in the art, this clamp is inserted into the pipe and is expanded when the joint is brought into proper spacing and alignment. Although clamps of this type are quite powerful, they are not so powerful that they can support a heavy pipe joint which extends in cantilever fashion 30, 40 or more feet from the joint. To apply sufficient pressure for such holding would probably stretch or split the pipe.

Consequently, auxiliary support means are provided and the null or zero-seeking device described above operates under control of the feelers to bring the pipe into alignment at the joint. Any tendency thereafter to deviate from such alignment puts a new force on the null device to which it is sensitive and it will correct itself to remove or minimize that new force. Since the clamp can withstand a moderate force tending toward joint misalignment, the system prevents application of any force sufficient to cause slippage at the clamped joint and alignment, having been once achieved, is maintained automatically.

Where desired, however, auxiliary lifting means, such as a crane supporting the new joint at about its middle point, or a crane supporting the end portion of the installed line, may be controlled automatically from the feelers, or from the null or zero-seeking device, to supplement the pipe control.

The system of the present invention, if desired, may involve the use of an extra tractor-mounted crane with a set of controls that can quickly be attached to the feeler-control or the null mechanism. The arrangement in such a case preferably is one wherein the cranes which support the pipe or the welder unit are interchangeable. Either crane then may be used to hold the installed line, or the new section, or the welding unit. By such means the next section may be brought up into approximate position while the two first units are still in use. With such equipment the units may be leap-frogged so as to keep up with the excavator and other equipment and expedite the line installation.

While cutting the gap to insure accurate alignment, and narrow gap width formed by cutting is presently preferred, the invention also contemplates mechanism for accurately spacing and holding the pipe ends in precise welding position without cutting.

The invention will be better understood by reference to specific embodiments which are illustrated in the drawings and described in more detail below. In said drawings, FIGURE 1 shows a diagrammatic plan view of the overall system in small scale. FIGURE 2 shows a side elevational view of the system of FIGURE 1, and FIGURE 3 is an end view on a somewhat larger scale. FIGURES 4 and 5 are enlarged cross sectional views through the pipeline taken at a joint to show respectively certain control elements at one stage of the operation, and a cutting and welding operation at a later stage. FIGURE 4A is an enlarged transverse sectional view of feeler gauge mechanism, taken substantially along the line 4A—4A of FIGURE 4.

FIGURE 6 is a side view of a control apparatus designed to bring the pipe ends into sufficiently precise alignment to permit automatic welding without a cutting or end-shaving operation. FIGURE 7 shows a transverse section at the joint with feeler gauge equipment for detecting and assisting in control of gap width. FIGURE 8 is a longitudinal detail sectional view, on a larger scale, showing a preferred means of mounting a feeler gauge.

FIGURE 9 shows in smaller scale an alternative system wherein an internal clamp is used to maintain end to end pipe alignment, in combination with a zero or null control supporting means to help establish and maintain alignment. FIGURE 10 is an enlarged side view of a null seeking device useful in the systems of FIGURES 3 and 9, for example.

FIGURE 11 shows a detailed schematic view of a control valve designed for the null control system of FIGURES 6 and 10.

Figure 1:
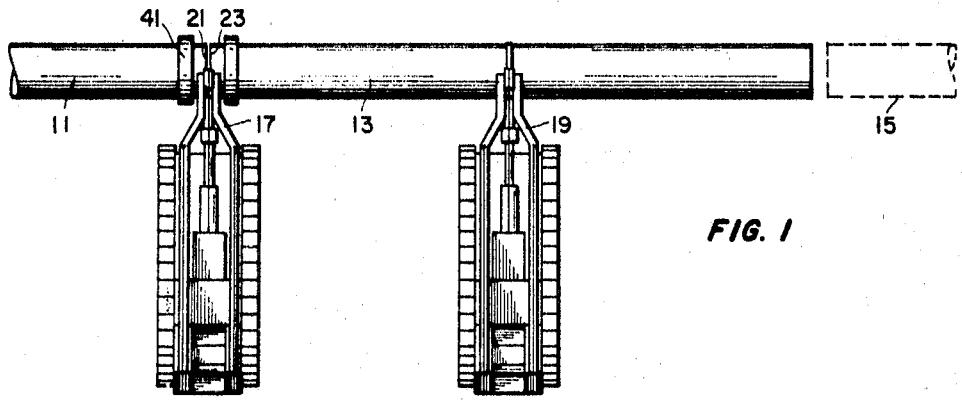

Referring first to FIGURE 1, a pipeline is shown in process of construction with an installed section 11, a section 13 being connected thereto, and a new section 15 shown at the right in dotted lines to be brought into place next. A tractor mounted crane 17 supports the end 21 of the installed section 11 and the adjacent end 23 of the section 13 which is to be welded to it next. Another tractor mounted crane 19 supports the main weight of section 13, by means of a sling 25 connected to it through a null control means 27, FIGURE 3. A winch 24 serves to lift the device 27.

Each of the tractors is provided with a straight arm or pusher device 30 which is movable horizontally to hold the pipe section in the desired lateral position. This pusher is controlled by a hydraulic cylinder 32 and piston unit 32a. It may also include a null seeking device 33 analogous to the device 27 which will be explained in further detail below. The flow of hydraulic fuel in cylinder 32 is controlled by conventional valve mechanism which, in turn, is controlled by feeler gauge mechanism to be described next.

Figure 3:
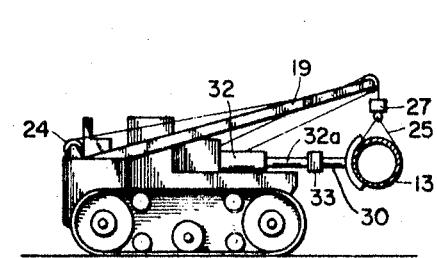
Figure 4:
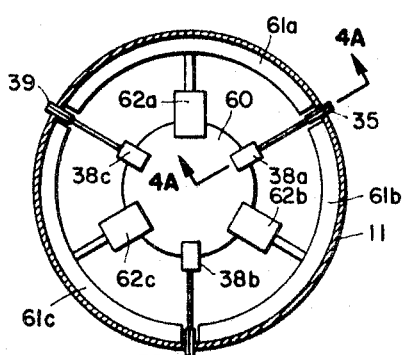
Figure 4A:
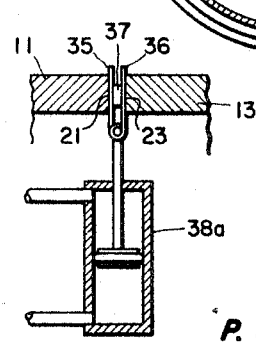

The feeler gauge mechanism, as best shown in FIGURES 4 and 4A, comprises a pair of thin laminations or blades 35, 36, of metal which have a microswitch mechanism 37 built in between them. The arrangement is such that the two blades, which normally spring apart and open the switch, when pressed firmly together have a combined thickness equal to the width of the desired slot or space between the pipe ends 21, 23. That is to say, the feeler gauge elements have a compressed thickness which may be either slightly less than or just equal to the optimum gap width. They are spring based so that they normally tend to spring apart as shown in FIGURE 4A, thereby breaking the electrical contact which is closed only when the blades are brought together. Each gauge unit may be projected into and out of gauging position by hydraulic control means 38a, 38b and 38c. Three pairs of gauge elements are preferably used, as shown at 35, 38 and 39, FIGURE 4, and they are connected through electrical wiring, not shown in detail, so that they activate both the straight arm mechanism 30, 32, and the lifter null mechanism 27, FIGURE 3, to bring the pipe sections into precise alignment. That is, the electrical circuits controlled by the three sets of gauges automatically cause the lifting and lateral aligning devices to hold the pipe so that all three switches are kept closed at least during the initial welding operation.

Preferably, one of the feeler gauges 38 is at the bottom of the pipe, and the others, 35 and 39, are each spaced therefrom by 120°. It will be evident then that if the bottom gauge 38 has its leaves or blocks closed, an open blade, on one side only, say 35 will cause the straight arm to move in the appropriate direction to close the gap on that side. If the side gauges 35 and 39 are both open, appropriate controls over winch 24, FIGURE 3, will cause the crane 19 to raise the outer pipe joint 13 to close the gap at the top. Assuming proper lateral alignment, if the upper side gauges 35 and 39 are both closed but bottom gauge 38 is open, the controls will cause crane 19 to lower the pipe. If there is lateral misalignment the hydraulic mechanism 32, 32a, makes automatic correction. Thus adjustment vertically and laterally is made automatically so that all three of the feeler gauges are tightly closed in the gap.

The pressure on the gauges is not so great after proper alignment that they cannot be withdrawn from the space between pipe ends. However, they are all kept in place until welding is started. The means for welding will next be described.

Figure 5:
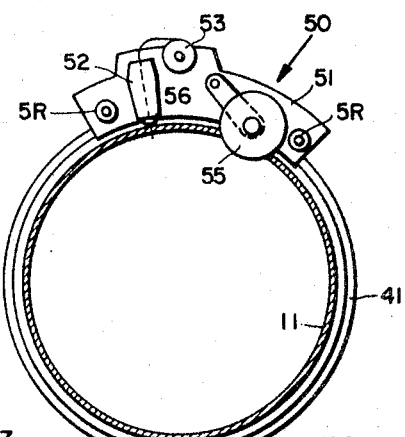

Referring to FIGURE 5, a circular guide track 41 is mounted firmly around the pipe section 11 near its end 21 (FIGURE 1), and parallel with its end surface. This track may be either a closed ring or a two-part ring, as described in the patents previously mentioned. It is so designed that it can be tightly secured in concentric position about the pipe, so that a welding machine, or a cutter-welder if desired, can be supported thereon against the force of gravity and against lateral forces tending to displace the welder from its track.

The welding unit 50 comprises a frame 51, guide rollers 5R which ride the track around the pipe circumference, and a welding head or contact tube 52. A reel 53 of thin wire consumable electrode material is supported on frame 51 and supplies the wire electrode material to the head or contact tube by automatic feed means. The latter are of any suitable type, such as those described in the patents just mentioned. Hence they are not shown in detail herein. A suitable drive motor for wire feed is provided also but is not shown herein since it forms no part of this invention.

In FIGURE 5, a cutter disc 55 is shown, mounted on a pivoted arm 56 so that it can be swung into or out of cutting position. It is provided with a powerful motor, not shown, which can be driven either electrically or pneumatically, as desired. The cutter, which may be either of the abrasive disc type or the milling cutter type, may be used to clean the gap between the pipe ends, making the pipe ends square and the gap of uniform width all around the circumference of the joint.

If the pipe ends are square and true, the cutter 55 can be left in the inoperative or raised position. In this case, the thickness of the feeler blade will determine the gap width. The feelers 35, etc., with their controls, which may include the null seeking lift device 27, will make sure that the new joint of pipe 13 is held continuously at the right height, even if the tractor which is supporting it through crane 19 is slowly settling or shifting its position due, for example, to standing on soft ground and/or possibly due to engine vibrations or other causes. Likewise, the lateral position of the pipe will be maintained by automatic movement of the pusher or straight arm 30. The latter may, if desired, be secured to the pipe by a girth strap so that it can pull as well as push. In most cases this is not necessary since the pusher can control the pipe by pushing it slightly out of vertical alignment with the lifter so that gravity provides the return force.

In the case the pipe ends are not square or in a true plane, the cutter is used, traveling ahead of the welding head or contact tube, e.g. clockwise as seen in FIGURE 5. Welding is preferably accomplished from top to bottom over one-half the circumference, welding first one-half of the pipe girth joint and then the other. If the cutter is used, the welder is reversed for the second half weld so that the cutter in any case can precede the welder. If the cutter is not used such reversal is not necessary. To avoid reversing the unit, a cutter device may be mounted on either end with the welding head about midway between. Alternatively two welding heads may be positioned on either side of the cutter so that the active head will follow the cutter, no matter which direction is being followed. Also, if the cutter is used, the feeler gauges are each retracted by their controls at the appropriate times so that they are out of the way as the cutter approaches. If the cutter or cutters are not used, the gauges are also retracted by their controls to clear the welding operation but they are preferably kept in place until the welder closely approaches them so that gap width is closely controlled at all times. Once the parts are firmly secured, by welding near a gauge element, the gap cannot change and that particular gauge is no longer necessary. The feeler gauge is then withdrawn so that it will not be welded or interfere with welding. Control means for the hydraulic elements are provided in the form of electric switches along the guide track 41.

The gauges may be controlled in various ways but they are preferably mounted on the outer ends of small hydraulic pistons which operate under conventional valve controls in cylinders 38a, 38b, and 38c, respectively. See FIGURE 4. In one system which is often preferred, these cylinders are mounted in an expandable internal pipe clamp structure 60 which comprises internal pipe surface engaging shoes 61a, 61b, etc., each of which may be operated by a hydraulic piston 62a, 62b, etc., as is well known in the art. Alternatively, the clamp sectors or shoes may be expanded by mechanical toggle means of conventional form. The latter, in turn, are usually operated by fluid pressure devices, either pneumatic or hydraulic.

In practice the clamp is used to hold the two pipe ends in axial alignment and to insure that the adjoining pipe ends, which may be slightly out of round, are both made circular so that they line up all around the joint. Ordinarily the internal clamp is adequate to maintain axial alignment but it cannot be expected to hold the full weight of the new section which extends in cantilever fashion 30, 40 or as much as 80 feet in some cases. The internal clamp does, however, hold with substantial force so that once the pipe ends are properly aligned, a null device 27 can support the weight of the pipe and prevent the pipe ends from slipping on the clamp to change the gap width. The operation of the null device will be described in detail below. With such an arrangement, the gauges 35, 38, 39 may be withdrawn from gauging position as soon as the internal clamp is tightened.

While the mechanism so far described is operative to establish and maintain an accurate welding gap, it is sometimes desirable to use more positive means to move the pipe sections into the precise spaced positive before expanding the internal clamp, if such a clamp is used, or before performing any of the welding operations. A modified form of spacing and detecting means for this purpose is shown in FIGURE 6. Here the installed pipe 11 and the new section 13 have their adjoining ends inserted into and grasped by a pair of external ring clamps 70 and 72. The rings, which are split, can be expanded by suitable means such as toggle, operated electrically, hydraulically or mechanically, and contracted to receive and then tighty hold the pipe ends 21 and 23. The means, for doing this will be obvious and may comprise either a conventional toggle or a fluid piston and cylinder arrangement. These means may be pneumatically operated if desired. Such form no part of this invention.

The two split rings 70, 72, are connected together by a plurality of hydraulic cylinder and piston units 73, 74 and 75, preferably three. These are spaced 120° apart around the pipe. See FIGURE 7. Appropriate hydraulic fluid supply means and control valves are provided for micro adjustment of each unit. One member of each hydraulic unit, the cylinder 73a, is connected to ring 70 and the other, the piston 73b, is connected to ring 72. Hydraulic fluid from any suitable source is used to cause relative movement, in either direction, of the pistons and cylinders to change the spacing between the rings 70 and 72.

A suitable feeler gauge element is provided adjacent each hydraulic unit. These may be like the gauges 35, 38 39 previously described, but they are preferably mounted externally of the pipe, whereas the former are shown mounted internally. One of these gauges is shown at 80, FIGURE 6, and another, in somewhat modified form, is shown in a larger scale with more detail in FIGURE 8. The latter comprises a plate 81 resting on pipe section 11 having a thin down-turned lip 82 which overhangs the pipe end and extends into the gap. A block 83 mounted on plate 81 is bored to receive a slidable and rotatable shaft or rod 84, or it may be threaded, on which is mounted another feeler blade 85. The latter is secured firmly to the shaft 84 between nuts 86 and 87 threaded thereon. This provides for adjustment. The end of the shaft 84 is adapted to contact and close a microswitch (not shown) when the feeler blade 85 is pushed to the left, FIGURE 8, to the point where the gap is of the precise width desired. This switch locks the adjacent hydraulic unit, say 73, FIGURE 6, against further movement in either direction. When all three gauges, properly adjusted, are properly situated, all three hydraulic units 73, 74, 75, are locked in position and the gap of the desired width all around the pipe is firmly fixed. The feeler gauges are then retracted, or they may be moved bodily off the pipe if desired; thereupon, the internal clamp is tightened, if such is used, and the rings 80, 80 may be released and slid onto the new section of pipe 13. Then the welding trac 41, FIGURE 5, is moved into place and welding proceeds, as previously described.

Figure 2:
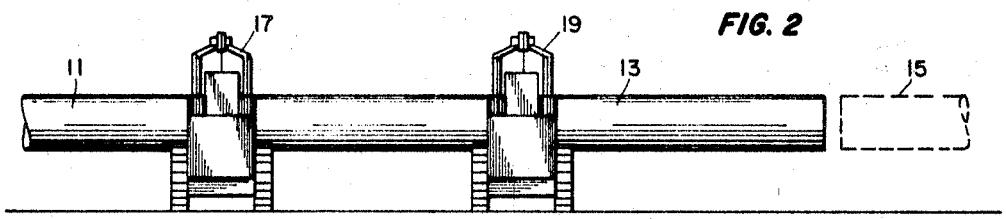

The system shown in FIGURE 9 is essentially the same as that of FIGURES 1, 2 and 3 except that the fixed section of pipe rests on stationary removeable supports 91, 92, 93. This avoids requirement of two tractor mounted cranes; however, when two cranes are used, both may be controlled from the welding gap feeler gauges with suitable electrical control circuits, not shown, giving somewhat more flexibility to the system.

FIGURE 10 shows in larger detail one of the null or zero-seeking devices 27 and FIGURES 3 and 9. The construction and operation of this device are as follows: it comprises a hydraulic cylinder 101, supplied with hydraulic fluid from suitable pump or pressure sources not shown, through upper and lower ports 102 and 103. Rigidly attached to the bottom of the cylinder is a C member 104 which can yield elastically more or less, depending on the load attached to it. This member bears at its lower end a ring 105 to which the pipe sling (25, FIGURE 3) is attached. A piston 110 in the cylinder has its rod 110R extending through the upper end of the cylinder and attached to the crane or other lifting device.

Between the open ends of the stiffly resilient C member are fitted the normally closed contact members 120, 121 of a lower switch unit 123 and the normally open contact members 125 and 126 of an upper switch unit 127. Adjustably positioned about midway between the opposed ends of the C member, by means of a support element 128 attached to the upper bar of the C, is a contact bar 130. It bears contact 120 of the lower switch, on its lower side, and contact 125 of the upper switch on its upper side. The arrangement is such that when a load on the C member 104 exceeds a desired value it yields sufficiently that the lower contacts 120, 121 are opened. When the load is less than the desired value, indicating that there is strain on the internal clamp 60, tending strongly to cause gap misalignment, if the clamp should slip slightly, the upper contacts 125, 126 are closed. The lower bar of the C in this case pushes contacts 120 and 121 together with enough force to spring the bar 130 upwardly and close 125 and 126.

It will be understood that the major part of the weight of the pipe will be supported by the crane through the null seeking device 27. If the crane is allowing the pipe to sag, so as to put a substantial force on the clamp at the joint, the null seeking switch arrangement senses the drop in load on the crane and causes the winch 24 to tighten up. If the crane is tending to hold the pipe too high, the reverse action occurs. Thus the reaction forces at the joint, as imparted to clamping means 60, for example, are sensed to keep proper tension on the main lift. So if a tractor should begin to settle in mud, for example, with consequent lowering of pipe section 13 at point 19, FIGURE 1, for example, the strain at the joint 21, 23, tending to cause misalignment, would cause the null seeking device 27 to initiate correction at the winch.

When the feeler gauges, e.g. 35, etc., FIGURE 4, are in place, they also exercise lift control and also lateral control through pusher bar 30 and its operating mechanism.

It will be understood in the following claims, that the gap between the first or installed pipe section and the new section to be added is first made quite highly uniform around the full periphery. This means that its width, of the order of $50/1000$ to $100/1000$ inch width, for example, does not vary more than about five or six percent, i.e., 2 to 6 thousandths of an inch with the dimensions given. By narrow gap, it is meant that the spacing between adjacent and axially aligned pipe ends in considerably less than the pipe wall thickness. For example, with normal pipe of about ¼-inch thickness, the gap may be around 0.050 inch to 0.080 inch, or around one-fifth to one-third the pipe wall thickness. With thin wall pipe, the gap might be as much as half the pipe wall thickness but usually not much more.

The pipe sections are held for ready adjustment but under such close control that the gap width does not change measurably. Instead of accomplishing this by brute holding force (which has hitherto been proposed but which might actually crush, split, or deform the pipe under high stress, e.g., with long cantilevered pipe sections held only by clamping near the joint), the apparatus is made sufficiently sensitive to stresses tending to change the gap so that the stresses are reduced or eliminated before slippage or deformation takes place near the gap.

Thus, for example, if the added pipe section 13, FIG-URES 1 and 2, should be inadequately supported, the system is adequately sensitive to the stress imposed for example on the internal clamp, FIGURE 4, to note a reduction in weight on the null device and to initiate corrective measures. In its process aspects, it will be apparent that other equipment quite unlike that shown in the accompanying drawings, may be employed to achieve the same result. The equipment shown and described, however, is simple, rugged and effective for the purpose.

Welding is preferably accomplished in a single pass, by which is meant that the operating welding head traverses any given part of the pipe circumference only once (except for minor overlaps at start and finish). In a preferred case, the welding head starts at the top and, proceeds to the bottom, the welder is then inactivated, rotated again to the top, and then is moved down and around the other side of the pipe. A single pass operation thus makes a joint sufficiently strong that work can be shifted to the next joint. This does not mean that the first joint is completely welded. It may require supplemental filling or finishing, or both, although in a preferred case a clean complete weld is formed in a single pass operation.

Forces which support the pipe sections include not only those which support it against gravity but also those which support it against lateral deflection, e.g. due to wind, vibration, or any other causes. An important aspect of the invention is that these forces are adjustable and their adjustment is controlled from conditions at the pipe joint through the necessary control means. The latter include not only a null-seeking vertical support 27 but may also include a lateral null device on the pusher (or "puller") arm, and these may be operating by direct sensing of stresses at the joint or may be supplemented by the closing or opening of microswitches incorporated into the feeler gauges, as previously explained.

For example, a pipe section 13 is out of line so that one of the microswitches in a feeler gauge, say gauge 39, is open. This fact, in itself, will signal the support and pusher mechanisms to correct the condition. The null device 27, and/or its counterpart in the pusher arm, have nothing to do with this unless and until the force applied affects one or more switches in the null devices. This cannot happen (because the electrical circuits do not permit it) until the feeler gauges all indicate proper positions at the joint. Manual means may be provided for achieving a different result if desired, e.g. by rendering the null devices effective independently of the feeler gauges in case some special adjustment (with manual gauging of the gap, for instance) is to be made, the clamp tightened, and the apparatus thereafter put under control of the null seeking equipment.

It will be understood that various modifications in apparatus and method may be adopted which are generally equivalent to those described above and which will be so understood by those skilled in the art. It is intended by the claims which follow, to cover all such, as far as the prior art properly permits.

What is claimed is:

1. A system for building pipelines which comprises supportings a first pipe section at an end where a further section is to be added by forming a joint, bringing the further section into close end-to-end proximity and in general axial alignment with the first section, establishing initially a narrow gap of highly uniform width between the adjacent pipe ends throughout their full periphery, maintaining the uniform gap by means of feelers inserted in said gap and an automatic corrective mechanism responsive to said feelers inserted in said gap, supporting the pipes by applying external support forces, and automatically controlling said forces to keep the gap dimensions substantially uniform throughout the joint periphery during welding, removing said feelers from said gap, and thereafter forming a girth weld around the gap in a single pass.

2. A system according to claim 1 wherein the narrow gap is machined to improve its uniformity after the gap is established and before it is welded.

3. A system according to claim 1 wherein the joint is securely clamped after the gap is initially established and thereafter stresses at the clamping site tending to change the gap are employed as signals to automatically adjust said external support forces.

4. A system according to claim 1 wherein a null point is established when the gap is initially adjusted, and wherein stresses tending to distort the established gap are communicated to the null point and utilized to control adjustment of support forces.

5. A system according to claim 1 wherein gap width is first sensed at the gap and the pipes are firmly clamped in desired gap adjustment, the supporting forces thereafter being placed under automatic control of stresses at the joint.

References Cited

UNITED STATES PATENTS

| | | | |
|---|---|---|---|
| 3,266,700 | 8/1966 | Bauer | 228—5 |
| 3,266,701 | 8/1966 | Peignen | 228—29 X |
| 3,267,570 | 8/1966 | Winkler | 228—9 X |
| 3,277,567 | 10/1966 | Rieppel | 219—60.1 X |
| 3,284,883 | 11/1966 | Haverfield | 228—49 X |
| 3,328,556 | 6/1967 | Nelson | 219—61 X |
| 3,360,177 | 12/1967 | Enkvist | 228—56.5 X |
| 2,845,989 | 8/1958 | Ewaldson | 228—10 X |
| 3,076,261 | 2/1963 | Christensen | 285—22 X |
| 3,084,244 | 4/1963 | Rieppel | 219—60.1 |
| 3,084,246 | 4/1963 | Rieppel | 219—60.1 |
| 3,126,471 | 3/1964 | Nelson | 219—60.1 |
| 3,137,782 | 6/1964 | Rieppel | 219—61 |
| 3,182,171 | 5/1965 | Persson | 228—49 X |
| 3,196,245 | 7/1965 | Nelson | 219—60.1 |
| 3,208,138 | 9/1965 | Eckhardt | 228—9 X |
| 3,210,068 | 10/1965 | Shelton | 29—493 |
| 3,236,547 | 2/1966 | Rieppel | 285—286 |

FOREIGN PATENTS

| | | |
|---|---|---|
| 1,124,904 | 3/1962 | Germany. |

JOHN F. CAMPBELL, Primary Examiner

J. L. CLINE, Assistant Examiner

U.S. Cl. X.R.

219—61, 5, 22